Sept. 8, 1959   W. RUEGGEBERG   2,903,543
DIELECTRIC HEATING
Filed Oct. 29, 1954

INVENTOR
WERNER RUEGGEBERG
BY
ATTORNEY

United States Patent Office 2,903,543
Patented Sept. 8, 1959

2,903,543

DIELECTRIC HEATING

Werner Rueggeberg, Lancaster, Pa., assignor to Armstrong Cork Company, Lancaster, Pa., a corporation of Pennsylvania Application October 29, 1954, Serial No. 465,654

6 Claims. (Cl. 219—10.53)

This invention relates to the heating of articles by means of electric energy. More particularly, it relates to the heating of articles by the application of a high-frequency electric field, and still more particularly it relates to the joining of heat-sensitive articles of poor electrical conductivity in an edge-to-edge relationship by the application of electric energy.

The joining or bonding of articles by exposure to high-frequency electric fields has been widely used. The heat resulting from the application of high-frequency electric fields is partly due to the molecules of the substance being so affected that they attempt to align themselves with the rapidly oscillating electric field. The motion of the material aggregates causes a rise in temperature in the article to the extent that the article is subjected to an alternating electric field of a given frequency.

This method of heating has been widely used in many applications. Some materials containing water may be rapidly dried, since the high loss factor of such materials usually responds to the action of a high-frequency electric field. In addition, the technic has been applied in the preheating of plastic materials before molding, as well as the curing of various resins once the resins have been properly formed. Furthermore, the technic is particularly applicable to the bonding of heat-sensitive articles which cannot normally be subjected to such processes as high temperature baking or curing.

In a conventional dielectric heating arrangement, the area of heating is usually defined by a pair of flat electrodes spaced by the articles to be heated. Thus in the usual case, a stack of the articles to be heated will lie between two flat electrodes. This sandwich arrangement has given excellent results in the surface bonding of flat sheets and the like. Where, however, it becomes necessary to bond objects in an edge-to-edge relationship or to bond cylinders or large thick squares of material, the usual electrode arrangement is often impractical. The area to be bonded is usually simply a joint in the shape of a plane surface. If the joint is to be bonded, as with a thermosetting resin or other glue, then the two electrodes must heat an unduly large amount of the heat-sensitive material in order to supply the necessary heat to the thin plane defined by the joint.

It is, therefore, the primary object of the present invention to supply a method and apparatus which is peculiarly adapted to the joining of heat-sensitive articles of poor electrical conductivity in an edge-to-edge relationship. It is a further object of the present invention to supply a method and apparatus for confining the heat generated by a high-frequency electric field to the vicinity of the joint itself. It is still another object of the present invention to supply a means for controlling the heat generated by a high-frequency electric field when used in the joining of heat-sensitive articles.

According to this invention, articles are joined in an edge-to-edge relationship by utilizing a first electrode on one side of a joint to be formed, and at least one other enclosing electrode on the other side of the joint, the electrodes being so spaced as to produce a heating effect at the joint. With this arrangement it is possible to concentrate the heating effect in the vicinity immediately adjacent to the joint itself. It is further possible to control the heating effect from the exterior surfaces of the area surrounding the joint to the interior regions lying at the middle of the pieces to be joined.

In order that the invention may be readily understood, a preferred embodiment will be described in conjunction with the attached drawings, in which.

Figure 1:
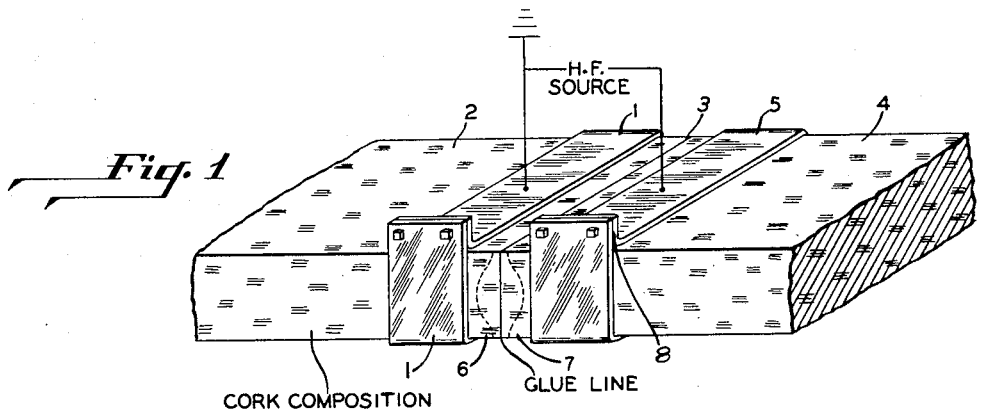
Figure 1 is a perspective view showing the disposition of two enclosing electrodes to concentrate the heating effect in the vicinity of the glue line.

Referring to Figure 1, there is shown a first enclosing or wrapped electrode 1 extending completely around the periphery of one piece of an article 2 to be joined; in the illustration shown in Figure 1, the article is, for the purposes of illustration, taken to be a cork composition. The joint 3 is the interface between article 2 and article 4 to be joined together at the joint 3. In the figures the joint 3 is described in all cases as being a glue line, it being understood that any of the customary materials useful in joining articles by means of dielectric heating may be utilized. A second enclosing electrode 5 extends around the periphery of the article 4. Electrode 5 is spaced a distance from the joint 3 equivalent to the same distance of electrode 1 on the other side of the joint 3.

When the electrodes 1 and 5 are connected in known manner to a source of high-frequency voltage, an electric field will be generated in the vicinity of the joint 3. An approximation of the intensity of this electric field and hence of the heating effect is indicated in Figure 1 by the approximate spacing of lines indicating the equipotential surfaces 6 and 7. It should be recognized that the approximate equipotential surfaces 6 and 7 are curved surfaces that extend through the interior of articles 2 and 4 from the front face shown in Figure 1 right through to the back face, not shown.

By the arrangement of the two electrodes as shown in Figure 1, the high-frequency electric field and hence the zone of heating is confined to the zone where it is needed most, namely the area adjacent the joint 3. The spacing of the electrodes is significant but not critical. If the electrodes are very close together, that is on the order of a millimeter, the heating effects will be confined to the joint area, except that an undue amount of heating will occur on the peripheral surface around the joint 3, while less heating will take place at the center of the joint 3 inside the articles 2 and 4. Thus it is preferred that the two electrodes be spaced further apart from the joint. An increase in spacing causes a progressive weakening of the field intensity, and hence the heating effect, unless the voltage is proportionately increased. Thus it can be seen that although the electrodes may be very close together or very far apart, neither of these two extreme positions allows the functioning of the electrodes with optimum efficiency. It is, therefore, preferred that the electrodes occupy some intermediate position, which position can be readily determined by one skilled in the art, depending on the voltages used, the frequency used, the thickness of the pieces to be joined, the dielectric properties of the pieces to be joined, and the character of the adhesive used to form a bond.

It should also be apparent that the joint 3 should be substantially centered between the two enclosing or wrapped electrodes 1 and 5. If the joint 3 is not in the center, then the optimum heating zone will not be that surrounding the joint 3 but instead will be shifted to one side or the other, depending on the distance that one electrode or the other is displaced from an equidistant position from the glue line.

Electrodes 1 and 5 may be fabricated from any suitable material, such as copper. In addition, they may be made in any form convenient for placing on the articles to be bonded. For example, if it is impractical to slide the electrodes over the ends of the articles to be bonded, then the electrodes may be split as illustrated in Figure 1 at the junction 8. Such a junction may allow the placement of the electrodes over the ends of articles to be joined when the article is of such nature as to prohibit the simple slipping on of the electrodes over opposite ends. Hinges may be used on the electrodes to facilitate placing them around the articles to be joined.

In Figure 2 are again shown articles 2 and 4 to be joined, the joint 3, the electrodes 1 and 5, and the modified equipotential surfaces 6 and 7. In addition, there is shown a wild electrode 9. The wild electrode 9 is not electrically connected to anything, either ground or high-frequency source. It is, however, capacitively self-coupled to electrodes 1 and 5 by virtue of the high potential applied to electrodes 1 and 5. The wild electrode 9 thus assumes a potential lying between those imposed on electrodes 1 and 5, and hence it will reduce the peripheral breadth of the field around the surface of the joint 3. This reduction can be seen in the drawings by comparing equipotential surfaces 6 and 7 in Figure 1 with equipotential surfaces 6 and 7 in Figure 2; the latter are straighter. With only two electrodes present, for example electrodes 1 and 5 as in Figure 1, there will be appreciable electric stress over the peripheral surface of the articles 2 and 4 at the joint 3. The introduction of the wild electrode 9 reduces the stress on the surface while at the same time maintaining substantially unaltered the stress that exists in the center of the joint 3 in the interior of the pieces 2 and 4. Thus the wild electrode 9 tends to equalize the electric field found in the region of the joint 3. In this manner there is eliminated the difficulty sometimes encountered of having the surface areas of the heated zone char, while the interior of the heated zone does not reach a sufficiently high temperature to effect a cure of the glue or resin. Although the use of a wild electrode is not mandatory in the process of the present invention, it is preferred, particularly in those cases where a heat-sensitive composition such as cork composition is to be bonded. In most cases, the use of a wild electrode allows the heating of the entire area of joint 3 at substantially the same rate of speed. If desired the position of the wild electrode may be so adjusted that the interior of the joint area heats faster than does the outside peripheral surface.

Figure 2:
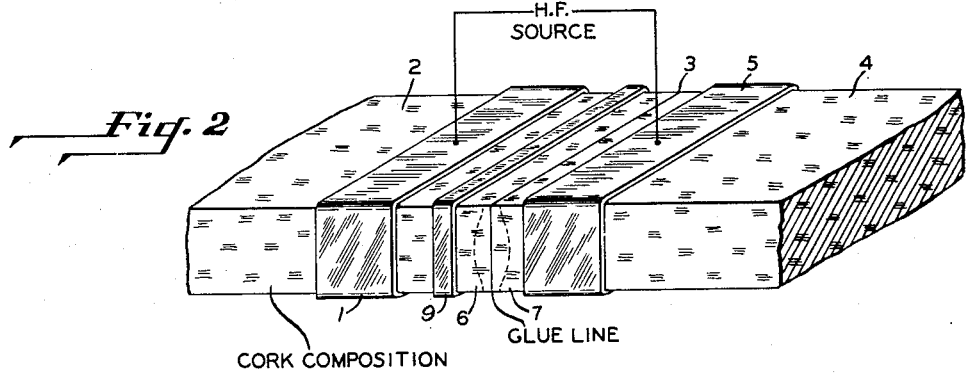
Figure 2 is a perspective view showing three electrodes used to diminish the heating effect around the peripheral surface of the glue line while substantially maintaining the heat effect at the center of the pieces to be joined.

It should be noted that when a wild electrode is used, the spacing of the various electrodes one from the other is best determined by experimentation for a particular configuration. In Figure 2, electrode 5 occupies a certain position. The wild electrode 9 occupies a position on the other side of the joint 3, which position is not necessarily the same distance from the joint 3 as is the distance from the joint 3 to the electrode 5. In addition, the electrode 1 is positioned on the other side of the wild electrode 9 from electrode 5. Here, too, if the electrodes 1 and 5 are positioned too far apart, the electric field will be sufficiently weak as to call for an undue amount of heating time, unless the voltage is stepped up accordingly. The electrode 5 may be positioned as if the arrangement of Figure 1 were to be used. The electrode 1 may then be positioned at a greater distance on the other side of the joint 3. The wild electrode 9 will then be positioned intermediate between the electrode 1 and the joint 3. The precise position of the wild electrode 9 will depend again on the various factors that control the location and intensity of the electric field generated by high-frequency voltages.

In some circumstances the electrode 9 may abut against the electrode 1 or electrode 5 if desired. If this is true, then there exists simply the arrangement shown in Figure 1, wherein only two enclosing electrodes are utilized. Contact between the wild electrode and either of the other electrodes may be maintained until it becomes desirable to minimize the stress located at the surface of the joint, at which time the wild electrode may be separated from contact with the other electrodes in accordance with the above description.

More than one wild electrode may be used if desired. The wild electrodes need not be concentrated on one side of the glue line. One or more may be spaced on each side, depending on the desired effects.

The electrodes illustrated in Figure 2 may also be of the split variety, as illustrated in Figure 1, in order to facilitate easy removal from the articles to be joined.

Figure 3:
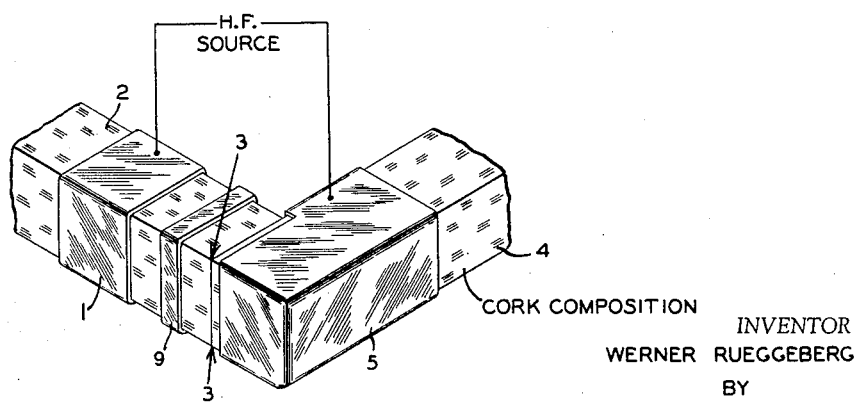
Figure 3 is a perspective view showing an alternate arrangement of the electrodes in order to accomplish heating on a different geometric configuration.

Figure 3 illustrates another embodiment of the present invention. In Figure 3 is shown the joining of two rectangular cork composition articles at right angles. The articles 2 and 4 are each encompassed by enclosing electrodes 1 and 5 along with the wild electrode 9. This arrangement again permits the control of the heat distributed through the joint 3 both on the peripheral surface and in the interior.

It should be apparent that the present invention is useful for joining not only square and rectangular objects, but also for circular and irregular shaped objects wherein the glue line has a slight angle or where there exist surface variations with offset portions or with tapers. In each case the electrodes need only be disposed in the relationship described herein in order to achieve the controlling of the electric field in such a way as to achieve an even distribution of heat throughout the joints. This is true because the present invention involves the bringing into proximity of two regions (in the volume sense) of different electric potential for the generation of useful electric fields at a desired vicinity between the two volumes. Prior work generated fields by bringing into proximity two surfaces that tend to parallel each other with the intervening space being used for heating.

For very large cross sectional pieces of, say, one square foot or more, symmetrical or irregular in shape, the enclosing electrodes will provide satisfactory heating effects at the glue area at electrode voltages substantially lower than those needed with conventional flat plate electrodes that tend to parallel one another. In such cases the present invention reduces the insulation requirements that have sometimes presented difficult problems.

The phrase "enclosing electrode" as used herein means an electrode which encircles at least a portion of an article to be joined.

Although the adhesive used to join the articles may be any desired adhesive, it is preferable in the case of cork composition to use a binder of glue, glycerine, and formaldehyde. However, other glues and such binders and adhesives as thermosetting and thermoplastic resins have been and may be used where desired.

The following example illustrates an embodiment of the present invention:

*Example*

Blocks of cork composition of rectangular cross section were cut with square ends and the ends treated with a glue composition consisting of glue, glycerine, and formaldehyde. Two enclosing copper electrodes measuring 2½" in length, 3½" in width, and 2" in depth were slipped over the blocks so that the electrodes fit snugly around the cork article. The end surfaces covered with glue were contacted and the two enclosing electrodes were each arranged so that one was at a distance ¼" from the glue line and the second was ¾" from the glue line. A third wild enclosing electrode ¼" in width was disposed ¼" from the glue line on the same side as the second enclosing electrode.

There was impressed on the two enclosing electrodes a voltage of 1500 volts at a frequency of 40 megacycles per second. The voltage was maintained for a period of time of 60 seconds.

At the end of that time, the electrodes were removed and the cork article allowed to cool. A strong, coherent, homogeneous bond was found to exist.

When the above example is carried out using two opposing flat plate electrodes a weaker bond is formed. In addition, the cork composition was overheated at the surface just under the electrodes while the glue at the center of the pieces remained undercured.

I claim:

1. In an apparatus for dielectrically heating a substantially planar interface between two dielectric articles disposed in abutting relation to one another at said interface, first, second, and third enclosing electrodes spaced from one another along said articles, said first and second electrodes each being of substantially annular configuration and being disposed in said enclosing relation to the same one of said articles on one side of said interface, said second electrode being positioned between said first and third electrodes with said third electrode between disposed in said enclosing relation to the other of said articles on the other side of said interface, means for energizing said first and third electrodes with high frequency energy thereby to produce a high frequency field extending through said interface in directions transverse thereto, said second electrode being isolated from ground except for stray capacities to ground, and being electrically coupled to said first and third electrodes only by interelectrode capacities inherently existing between said electrodes, whereby said second electrode is adapted to float electrically thereby to assume a potential, due to said interelectrode capacity coupling between said second electrode and said first and third electrodes respectively, dependent upon the spaced position of said second electrode relative to said first and third electrodes.

2. An electrode system for dielectrically heating dielectric workpieces comprising first, second, and third electrodes disposed in substantially aligned relation and spaced from one another in the order named, each of said electrodes being disposed in enclosing relation to a workpiece to be heated, a source of high frequency energy connected to said first and third electrodes but isolated from said second electrode except for interelectrode capacitances inherently present between said second electrode and said first and third electrodes respectively, said second electrode being isolated from ground except for stray capacities existing between said second electrode and ground whereby said second electrode is adapted to assume a potential dependent upon the position of said second electrode relative to both said first and third electrodes, said second electrode being adjustable in position between said first and third electrodes to permit said assumed potential to be varied by changes in position of said second electrode toward one of said first and third electrodes and away from the other of said first and third electrodes thereby to effect attendant changes in the interelectrode capacities existing between said second electrode and said first and third electrodes respectively.

3. In an apparatus for dielectrically heating a substantially planar interface between two elongated dielectric articles respectively having substantially planar surfaces abutting one another at said interface, a first enclosing electrode disposed adjacent to one of said articles, said first electrode having an edge closest to said interface facing said interface at one side thereof and extending in a plane disposed substantially parallel to the plane of said interface, a second enclosing electrode disposed adjacent to the other of said articles, said second electrode having a further edge closest to said interface facing said interface at the other side thereof and extending in a further plane disposed substantially parallel to the plane of said interface, whereby said first-mentioned and further closest edges of said electrodes are disposed in substantially parallel spaced relation to one another and to the plane of said interface on opposite sides of said interface respectively, a source of high frequency energy coupled to said first and second electrodes for producing a high frequency heating field extending between said electrodes within said dielectric articles and through said interface in directions transverse to the plane of said interface, and means for reducing variations in the electrical stress present at spaced portions of said interface comprising at least one third enclosing electrode disposed adjacent to said articles at a position between said first electrode and said second electrode, said third electrode having a pair of edges facing said first-mentioned and further edges respectively and spaced therefrom, said third electrode being isolated from ground as well as from said first and second electrodes except for capacities inherently existing therebetween, whereby said third electrode is adapted to float electrically thereby to assume a potential dependent upon the spaced position of said third electrode relative to said first and second electrodes.

4. The combination of claim 3 wherein said third electrode is positioned substantially equidistant between said interface and said closest edge of said first electrode.

5. The combination of claim 3 wherein said third electrode is adjustably positionable between said first and second electrodes thereby to permit variation in the potential assumed by said third electrode.

6. In an apparatus for dielectrically heating a limited region of a dielectric workpiece, a pair of electrodes disposed adjacent said workpiece in substantially aligned relation to one another on opposite sides of said limited region, said electrodes each enclosing said workpiece, means for energizing said electrodes with high frequency energy thereby to produce a high frequency heating field extending through said limited region of said workpiece between said electrodes, said field producing a non-planar equipotential surface on the interior of said workpiece operative to establish gradients in electrical stress along a predetermined interior plane of said workpiece within said limited region, and means for reducing said gradients in electrical stress along said predetermined interior plane of said workpiece comprising at least one further electrode enclosing said workpiece and disposed between said pair of electrodes at a position adjacent to but displaced from said predetermined interior plane of said workpiece, said further enclosing electrode being isolated from ground and from said pair of electrodes except for inherent capacities existing therebetween whereby said further electrode assumes a potential, between the potentials on said pair of electrodes, dependent upon the position of said further electrode relative to said pair of electrodes.

References Cited in the file of this patent

UNITED STATES PATENTS

| | | |
|---|---|---|
| 1,954,678 | Meissner | Apr. 10, 1934 |
| 2,205,582 | Steimel | June 25, 1940 |
| 2,397,615 | Mittelmann | Apr. 2, 1946 |
| 2,472,708 | Jones | June 7, 1949 |
| 2,480,299 | Klinke | Aug. 30, 1949 |
| 2,498,027 | Brown | Feb. 21, 1950 |
| 2,528,810 | Zimmerman et al. | Nov. 7, 1950 |
| 2,542,702 | Prow | Feb. 20, 1951 |
| 2,590,562 | Neilsen | Mar. 25, 1952 |
| 2,631,222 | Neibling | Mar. 10, 1953 |
| 2,643,325 | Body et al. | June 23, 1953 |

FOREIGN PATENTS

| | | |
|---|---|---|
| 574,657 | Great Britain | Jan. 15, 1946 |
| 260,146 | Switzerland | July 16, 1949 |